United States Patent Office 3,271,105
Patented Sept. 6, 1966

3,271,105
PROCESS FOR THE SEPARATION AND RECOVERY OF HYDROXYLAMMONIUM SALT
Wallace F. Runge, Terre Haute, Ind., assignor to Commercial Solvents Corporation, a corporation of Maryland
No Drawing. Filed Feb. 3, 1964, Ser. No. 342,284
13 Claims. (Cl. 23—87)

The present invention relates to the separation and recovery of a hydroxylammonium salt from an aqueous mixture of the salt and alkanoic acid, and more particularly to the separation of the reaction products of a reaction between a primary nitroalkane and a strong mineral acid in water. More specifically, the present invention relates to a hydrocarbon solvent extraction of hydroxylammonium salt from its admixture with the alkanoic acid in water.

The hydroxylammonium salt, e.g. hydroxylammonium chloride, recovered according to the process of the present invention is used in the production of methyl-ethyl ketoxime which is useable as an anti-skinning agent in paint formulations, is useful as a reducing agent in photographic chemicals, and as a reducing agent for reducing the ferric ion to the ferrous ion.

The present invention has for its primary object the recovery of a hydroxylammonium salt from an aqueous mixture of the salt and alkanoic acids. Another object of the present invention is the provision of the hydroxylammonium chloride of relatively high purity, for instance a purity generally higher than 90 percent. Another object of the present invention is the separation of the hydroxylammonium salt from the acid contained in the reaction product obtained by reaction of a primary nitroalkane having from 2 to 10 carbon atoms with a strong mineral acid in water. Still another object of the present invention is the provision of an expeditious process for the recovery of hydroxylammonium salt from a mixture including it, water, and an alkanoic acid. Other objects of the present invention will become apparent from the further description hereinbelow.

The hydroxylammonium salt in admixture with an alkanoic acid in water may be produced by a reaction between a primary nitroalkane having from 2 to 10 carbon atoms, a strong mineral acid, e.g. sulfuric acid, phosphoric acid, and hydrochloric acid, and water at a high temperature. This reaction is advantageously carried out at a pressure of approximately 30 to 500 p.s.i.g. and at a temperature of between about 120° and 190° C. for a period of from about 5 minutes to several hours. Other products of the reaction include the acid corresponding to the nitroalkane having from 2 to 10 carbon atoms and unreacted starting materials.

The primary nitroalkanes employed in the process of the copending application include 1-nitropropane, 1-nitrobutane, 1-nitroethane, 1-nitropentane, 1-nitroheptane, 1-nitrononane and 1-nitrodecane.

Separation of hydroxylammonium chloride from its admixture with the alkanoic acid in water has, in the past, been difficult. The water in the mixture, especially when 1-nitropropane has been used as starting material, renders separation difficult since the propionic acid produced makes the unreacted 1-nitropropane soluble in water along with the hydroxylammonium chloride. Otherwise, separation and recovery of the hydroxylammonium chloride from the 1-nitropropane would be easy. Water also complicates the separation and recovery since it forms an azeotrope (82% water) with the propionic acid and, accordingly, approximately 18% propionic acid is lost in the recovery before reaching the anhydrous state. The market for propionic acid is mainly for the anhydrous acid. The process of the present invention can avoid loss of the 18% propionic acid by azeotropic distillation.

In accordance with the present invention, it was surprisingly found that the hydroxylammonium salt, in a highly pure form, could be recovered by an extraction process. Generally, the process of the present invention comprises contacting an aqueous solution of the hydroxylammonium salt and alkanoic acid with a hydrocarbon solvent under solvent extraction conditions to form an aqueous layer containing the hydroxylammonium salt and an organic layer containing the acid, separating the layers, and recovering the hydroxylammonium chloride.

The aqueous solution of the hydroxylammonium salt and alkanoic acid can be the reaction product produced by reacting a nitroalkane, mineral acid and water as noted supra. The reaction mixture containing the hydroxylammonium salt and the alkanoic acid, e.g. the acid corresponding to the nitroalkane starting material, is advantageously maintained at a temperature above the crystallization temperature of the hydroxylammonium salt and the reaction mixture is advantageously conducted through a solvent extraction apparatus containing a hydrocarbon solvent. The solvent extraction product divides into an organic phase containing the alaknoic acid and any unreacted nitroalkane, and an aqueous phase containing the hydroxylammonium salt, mineral acid and water. The organic phase may be fractionally distilled to recover the alkanoic acid, nitroalkane, and the hydrocarbon solvent used in the extractor. The hydroxylammonium salt may be recovered from the aqueous phase by distilling off the water together with, when used, hydrochloric acid. When sulfuric or phosphoric acid is used, it is generally used in an amount such that it will be substantially consumed and no effort is necessary to separate the salt from the acid which would not distill off with the water.

The temperature at which the reaction mixture is maintained during the extraction operation should be chosen within limits designed to avoid crystallization of the hydroxylammonium salt and formation of an azeotrope between the water and the hydrocarbon solvent. The exact temperature depends upon the composition of the reaction mixture. Generally, a temperature within the range of from about ambient temperature, e.g. 20° C. to 100° C. is preferred. In determining the exact temperature to be used, the boiling point of the reaction mixture and the hydrocarbon solvent used in the extraction should also be considered. For instance, when using toluene, a maximum temperature of about 85° C. is utilized.

Aqueous mixtures containing from about 10% of each of the hydroxylammonium salt and the alkanoic acid in water to as low as 10% water, may be economically separated according to the present invention although mixtures without these limits may also be separated.

The ratio of the hydrocarbon solvent to the crude reaction mixture may vary within wide limits. Generally from about 0.5 to 5 parts or more by weight of the solvent to 1 part by weight of the crude reaction mixture may be used. Advantageously the ratio may be approximately 1:1 by weight since there is no advantage in using more solvent than required.

The solvent used in the extraction step of the present invention may be any water-insoluble hydrocarbon solvent selective for the alkanoic acid and not selective for the hydroxylammonium salt which solvent is inert to the reaction mixture and has a boiling point difference such that it can advantageously be fractionally distilled from the acid and the nitroalkane. A boiling point difference of about 5 to 10° C. is usually sufficient. The solvent also should boil at a temperature from about room temperature to about 200° C. to facilitate its separation. Solvents useable in the process include aromatic hydrocarbons, e.g. mono-ring aromatics such as toluene and benzene and nitrobenzene.

The residence time of the reaction mixture within the extractor falls within wide limits depending upon the composition of the reaction mixture. For instance, more dilute mixtures require a larger extraction column and consequently a longer residence time. Typically, this residence time is between about 1 minute and 1 hour.

The use of countercurrent extraction is preferred in that it is cheaper to operate and may be carried out continuously; however, if preferred, a batch operation can also be employed, for instance with a separatory funnel.

The hydroxylammonium chloride recovered by the process in accordance with the present invention is of relatively high purity, e.g., about 90 to 95%.

The following examples serve to further illustrate the present invention without, however, limiting the same.

*Example I*

2156 g. of 2-phase reaction mixture of the following composition:

| | Percent |
|---|---|
| Hydroxylammonium chloride | 25.2 |
| Propionic acid | 27.3 |
| 1-nitropropane | 7.2 |
| Free HCl | 9.7 |
| $H_2O$+other by-products | 30.6 | was held at 75 to 80° C. to avoid crystallization and fed into the top of a countercurrent extractor (packing filled with toluene—225 cc.) at the rate of 13.1 cc./minute (9.03 cc. aqueous phase+4.06 cc. organic phase). Toluene was passed into the bottom of the extractor at 9.55 cc./minute. The entire system was held at 75 to 80° C. during operation.

An organic phase was continuously withdrawn from the top of the column and an aqueous phase continuously withdrawn from the bottom of the column.

The apparatus consists of two bulbs for layer separation at the top and bottom separated by a column packed with 4 mm. glass helixes.

After passing through the extractor, the products present in the reaction mixture were distributed as follows.

| | Percent |
|---|---|
| Organic phase: | |
| Hydroxylammonium chloride | 0.47 |
| Propionic acid+trace impurities | 99.7 |
| 1-nitropropane | 100 |
| HCl | 0.0 |
| Aqueous phase: | |
| Hydroxylammonium chloride | 99.6 |
| Propionic acid | 0.3 |
| 1-nitropropane | 0.0 |
| HCl | 100 |

The organic phase was fractionally distilled to separate the propionic acid and 1-nitropropane, as well as the toluene. The aqueous phase was evaporated to dryness (wherein the propionic acid and hydrochloric acid residues distill off with water) to recover hydroxylammonium chloride (93% pure) as a crystalline solid residue.

*Examples II to VI*

The solvent extraction procedure employed in Example I is conducted in essentially the same manner except the following substitutions are made for the hydroxylammonium salt, solvent and alkanoic acid: hydroxylammonium chloride, nitrobenzene and ethanoic acid.

While in the foregoing specification I have set forth details of the several steps of the present invention, with reference to a specific example thereof, it will be understood that such details may be varied widely by those skilled in the art without departing from the spirit and scope of the invention.

It is claimed:

1. A process for the separation and recovery of an hydroxylammonium salt from an aqueous reaction mixture produced by the reaction of a primary nitroalkane having from 2 to 10 carbon atoms, a mineral acid and water, said reaction mixture containing the hydroxylammonium salt corresponding to said mineral acid and the acid corresponding to said nitroalkane, comprising maintaining said reaction mixture above the crystallization temperature of said hydroxylammonium salt, passing said reaction mixture through a solvent extraction zone containing a water-insoluble mono-ring aromatic hydrocarbon solvent selective for said acid and said nitroalkane, removing an aqueous phase containing said hydroxylammonium salt from said zone, and recovering said hydroxylammonium salt from the aqueous phase.

2. A process as defined in claim 1 wherein said temperature is between about room temperature and 100° C.

3. A process as defined in claim 1 wherein said solvent is toluene.

4. A process as defined in claim 3 wherein said solvent and said reaction mixture are continuously passed through said solvent extraction zone countercurrently and organic and aqueous phases are removed continuously.

5. A process as defined in claim 3 wherein said reaction mixture contains from about 10% each of hydroxylammonium salt and said acid to as low as about 10% water, as an upper limit with respect to the hydroxylammonium salt.

6. A process according to claim 5 wherein an organic phase containing said solvent, said acid and unreacted nitroalkane is removed from said zone and fractionally distilled to separate and recover said acid, said solvent and the remaining nitroparaffin starting material.

7. A process according to claim 6 wherein said recovery of the salt from said aqueous phase comprises evaporating the aqueous phase to recover said hydroxylammonium salt.

8. A process as defined in claim 7 wherein said mineral acid is selected from the group consisting of hydrochloric acid, phosphoric acid and sulfuric acid and said salt is the chloride, phosphate or sulfate, respectively.

9. A process for the separation and recovery of an hydroxylammonium salt from an aqueous mixture of the salt and an alkanoic acid having from 2 to 10 carbon atoms containing from about 10% each of hydroxylammonium salt and alkanoic acid in the water to a water content as low as 10%, comprising maintaining the aqueous mixture at a temperature from about 20 to 100° C., contacting the aqueous mixture under solvent extraction conditions with a water-insoluble mono-ring aromatic hydrocarbon solvent selective for said alkanoic acid to produce an aqueous layer containing the salt and an organic layer containing the acid, said solvent being employed in amounts from about 0.5 to 5 parts by weight of solvent to 1 part by weight of the mixture, separating the organic phase containing said solvent and acid from said aqueous phase containing said salt, and recovering said salt from said aqueous phase.

10. A process as defined in claim 9 wherein said acid is recovered from the organic phase.

11. The process of claim 9 wherein the salt is hydroxylammonium chloride.

12. The process of claim 11 wherein the alkanoic acid is propionic acid.

13. The process of claim 9 wherein the salt is hydroxylammonium chloride, the acid is propionic acid, and the solvent is toluene.

References Cited by the Examiner

UNITED STATES PATENTS 2,113,812  4/1938  Lippincott _____ 23—190
2,381,410  7/1945  Tryon _____ 23—190

OTHER REFERENCES

Weissberger, "Technique of Organic Chemistry," vol. (III), part (I) (Separation and Purification) page 304, Interscience Publishers Inc., 1956.

OSCAR R. VERTIZ, *Primary Examiner.*

BENJAMIN HENKIN, *Examiner.*

J. J. BROWN, *Assistant Examiner.*